United States Patent [19]

Wiest et al.

[11] 4,035,329

[45] July 12, 1977

[54] PROCESS FOR THE CONTINUOUS PRODUCTION OF AN ETHYLENE/VINYL ACETATE COPOLYMER DISPERSION

[75] Inventors: Hubert Wiest; Josef Hanzalik; Wilhelm Lechner; Erwin Lieb, all of Burghausen, Germany

[73] Assignee: Wacker-Chemie GmbH, Munich, Germany

[21] Appl. No.: 633,591

[22] Filed: Nov. 19, 1975

[30] Foreign Application Priority Data

Nov. 29, 1974 Germany .......................... 2456576

[51] Int. Cl.² ......................................... C08L 31/04
[52] U.S. Cl. ................. 260/29.6 T; 260/29.6 MM; 260/29.6 WA; 526/331
[58] Field of Search ............. 260/29.6 T, 29.6 WA, 260/29.6 MM, 17 A; 526/331

[56] References Cited

U.S. PATENT DOCUMENTS

| 2,703,794 | 3/1955 | Roedel ............................. 260/87.3 |
| 3,755,237 | 8/1973 | Isaacs et al. ................. 260/29.6 TA |
| 3,773,699 | 11/1973 | Bergmeister et al. ..... 260/29.6 MM |
| 3,817,896 | 6/1974 | Bergmeister et al. .... 260/29.6 MM |
| 3,883,489 | 5/1975 | Matschke et al. ............ 260/29.6 T |

*Primary Examiner*—Lorenzo B. Hayes
*Attorney, Agent, or Firm*—Hammond & Littell

[57] ABSTRACT

A process for the continuous manufacture of an aqueous ethylene/vinyl acetate copolymer dispersion which comprises continuously copolymerizing ethylene and vinyl acetate and optionally other α-olefinically unsaturated monomers, in an aqueous emulsion in the presence of an emulsifier and/or a protective colloid, and in the presence of a free-radical-forming redox catalyst system of a reducing agent and an oxidizing agent as well, optionally, as a heavy metal salt, and recovering said ethylene/vinyl acetate copolymer dispersion, characterized by (a) the presence of a molar excess of at least 3 times, preferably from 3 to 10 times, said reducing agent over said oxidizing agent dosed into the reaction medium and (b) adding the monomers continuously to the reaction mixture at such a rate that the concentration of unreacted monomers at no place in the reaction zone exceeds 15% by weight of the total weight of the reaction mixture.

5 Claims, No Drawings

4,035,329

PROCESS FOR THE CONTINUOUS PRODUCTION OF AN ETHYLENE/VINYL ACETATE COPOLYMER DISPERSION

THE RELATED ART

Processes for the continuous copolymerization of ethylene and vinyl esters have been described in U.S. Pat. No. 2,703,794 and in German Offenlegungsschriften Nos. (DOS) 1,720,467 and 1,900,112. In these processes, however, the polymerization does not progress at a satisfactory speed nor in a uniform manner, and there is also the disadvantage of the formation of wall deposits. Because of these factors, the advantages expected from continuous polymerization as compared with discontinuous or batch polymerization, such as a greater space/time yield and a better product uniformity, have not been realized in these processes.

OBJECTS OF THE INVENTION

An object of the present invention is the development of a continuous process for the production of an aqueous ethylene/vinyl acetate copolymer dispersion at a high space/time yield without formation of wall deposits on the reactor walls.

Another object of the present invention is the development of a continuous process for the manufacture of an aqueous ethylene/vinyl acetate copolymer dispersion, which comprises continuously copolymerizing ethylene and vinyl acetate, in a confined reaction zone, in an aqueous emulsion, in the presence of an emulsifier and/or protective colloid, and in the presence of a free-radical-forming water-soluble redox catalyst system comprising a reducing agent and an oxidizing agent in a molar ratio of at least 3:1, while adding the monomers at such a rate that the concentration of unreacted monomers at no place in the reaction zone exceeds 15% by weight of the total weight of the reaction mixture in the reaction zone.

These and other objects of the present invention will become more apparent as the description thereof proceeds.

DESCRIPTION OF THE INVENTION

The present invention provides a continuous process for the manufacture of an aqueous ethylene/vinyl acetate copolymer dispersion, which comprises continuously copolymerizing ethylene and vinyl acetate and optionally other α-olefinically unsaturated monomers, in a confined reaction zone in an aqueous emulsion, in the presence of an emulsifier and/or protective colloid, and in the presence of a free-radical-forming water-soluble redox catalyst system comprising a reducing agent and an oxidizing agent in a molar ratio of at least 3:1, optionally with a heavy metal salt, while adding the monomers at such a rate that the concentration of unreacted monomers at no place in the reaction zone exceeds 15% by weight of the total weight of the reaction mixture in the reaction zone.

Surprisingly, the present process enables polymerization to be carried out uniformly and quickly. This is particularly surprising since an excess of reducing agent would be expected to make the free-radicals formed immediately ineffective, and since a considerable excess of monomer would not have been expected to inhibit polymerization.

The present process is a continuous polymerization process, and thus the various components, namely monomers, water, catalysts, dispersants, and other auxiliaries, are continuously introduced into the polymerization reactor and an aqueous copolymer dispersion is continuously removed from the reactor.

More particularly, therefore, the present invention relates to an improvement in the process for the continuous manufacture of an aqueous ethylene/vinyl acetate copolymer dispersion, which comprises continuously adding a monomer mixture of ethylene and vinyl acetate containing up to 40% by weight of the share of the vinyl acetate of an α-olefinically unsaturated monomer copolymerizable with ethylene and vinyl acetate, in an aqueous emulsion containing emulsifiers and/or protective colloids, to a confined reaction zone, together with the continuous adding of a free-radical-forming water-soluble redox catalyst system comprising a reducing agent and an oxidizing agent and from 0 to 50 ppm, based on the total monomers, of a heavy metal in the form of a heavy metal salt, maintaining said confined reaction zone at a temperature sufficient to effect polymerization and continuously withdrawing an aqueous ethylene/vinyl acetate copolymer dispersion from said confined reaction zone, the improvement which consists of (a) continuously adding said reducing agent and said oxidizing agent in a molar ratio of at least 3:1 and (b) continuously adding said monomer mixture at such a rate that the concentration of unreacted monomers at no place in said confined reaction zone exceeds 15% by weight of the total weight of the reaction mixture in the reaction zone.

Various types of known reactors (the confined reaction zone) may be used for carrying out the present process, for example, stirrer reactors, tubular reactors, and a combination of both. The main consideration in choosing a suitable reactor is that the components added to the reactor through the input or inputs should be rapidly and thoroughly dispersed into the polymerization dispersion. The reactor should, of course, permit the introduction of ethylene and be able to withstand the necessary ethylene pressure. If desired, one or more reactors may be arranged in series, or one reactor may include several stages, for example, a spiral reactor may be connected downstream of a stirrer reactor, a disc reactor with several stages may be used, or a tubular loop reactor may be used. The reactor may, if desired, be used inconjunction with a gas chamber as a buffer, or it may be filled completely. The reactor may incorporate an automatic gas outlet valve so that the pressure within the system remains constant as further ethylene is pumped in. Advantageously, the pressure is maintained such that it is from 0.2 to 10 atmospheres higher than the vapor pressure of the monomers at the polymerization temperature, as described in British Pat. No. 1,003,290 and German Pat. (DAS) No. 1,137,216.

The various monomers, namely vinyl acetate, ethylene, and, optionally, one or more other α-olefinically unsaturated monomers copolymerizable with vinyl acetate and ethylene (especially monoolefinically unsaturated monomers), are conveniently pumped into the reactor at a constant rate and in the desired proportions. The emulsifier and/or protective colloid, in aqueous solution, is also conveniently pumped in at a constant rate. Advantageously, the monomers, water, emulsifier and/or protective colloid, and, optionally, other polymerization auxiliaries are mixed prior to being pumped into the reactor; this can conveniently be carried out in a special mixer. One catalyst component, preferably the reducing agent, may also be mixed in at this stage. The other catalyst component, preferably the oxidizing agent, may then separately be pumped into the reactor at a rate depending on the rate of polymerization. If several reactors are being used in series, the catalyst system may be partially introduced into successive reactors.

The polymerization is advantageously carried out at a temperature of from 10° to 100° C, preferably from 20° to 70° C. The polymerization pressure depends on the ethylene content but is advantageously from 5 to 200 atmospheres gauge and preferably from 10 to 100 atmospheres gauge. The pH of the polymerization medium is advantageously maintained from 2 to 8 and preferably from 3 to 6.

The free-radical-forming catalyst components used according to the present invention may be known water-soluble redox catalyst systems. The oxidation component is preferably a water-soluble inorganic peroxy compound, for example, hydrogen peroxide, an alkali metal persulfate, or an alkali metal percarbonate. Other examples of suitable oxidizing agents are organic peroxy compounds that are at least partially water-soluble, for example, tertbutyl hydroperoxide; azo compounds that are at least partially water-soluble, for example 2'-azo-bis(2-amidinopropane) hydrochloride; and high valency metal salts, for example, $Fe^{3+}$, $Ce^{4+}$ and $Mn^{3+}$ salts. Suitable reducing agents are, for example, alkali metal and alkaline earth metal sulfites, bisulfites, dithionites, dithionates, thiosulfates and formaldehyde sulfoxylates, and noble metal sols plus hydrogen, especially hydrogen/palladium sol. The redox catalyst system may additionally include a heavy metal, usually in the form of a heavy metal salt. Examples of heavy metals are iron, copper, cobalt, nickel, and manganese. These are suitably used in amounts of from 0.1 to 50 ppm by weight of metal, calculated relative to the total weight of monomers. The preferred redox catalyst system comprises a sulfite and tert-butyl hydroperoxide.

It has been found that when the redox system is used in a conventional manner, that is with not more than one mol of reducing agent per mol of oxidizing agent, slow and irregular polymerization reactions are obtained. Consequently, the concentration of monomers in the system is subject to considerable fluctuation. Moreover, considerable wall deposits can form. In the process of the invention, however, the molar amount of reducing agent should be at least three times that, preferably from 3 to 10 times that, of the oxidizing agent. In the present process, the polymerization proceeds at a greater speed and in a more uniform manner than in previous processes. Advantageously, the amount of oxidizing agent is from 0.01 to 2% by weight, calculated relative to the total weight of monomers. The amount of reducing agent is advantageously from 0.05 to 4% by weight, relative to the total weight of monomers, but should, of course, be such that the relative molar amounts of the two components are in accordance with the invention. If, with a constant amount of reducing agent, the amount of oxidizing agent is increased beyond the limit of the invention, then polymerization becomes more irregular and may slow down or even almost cease.

In the present process, the monomer content within the reaction system is maintained such that the weight of unreacted monomers at no place in the reaction zone exceeds 15%, and preferably does not exceed 10%, of the total weight of the reaction mixture. The monomer concentration may be maintained within this value, by appropriate regulation of the catalyst system concentration and of the rate of introduction of monomers into the system, and by immediate and effective distribution of the monomers into the dispersion as they are introduced through the inlet. The monomer concentration can be measured, and thus controlled, by determination of various variables, for example, determination of the monomer content, determination of the solids content, measurement of the heat of polymerization, or density measurement. It has been found that the limiting of the monomer concentration within the polymerization zone, together with the use of excess reducing agent, ensures rapid and uniform polymerization.

In the present process, higher space-time yields can be obtained than in previous processes, together with an improved chemical efficiency. This means that the yields are higher with aqueous dispersions prepared according to the present process than with those prepared according to previous processes. A further advantage of the present process is an improved ethylene incorporation into the copolymer with a consequent lower degree of foaming once the dispersions have left the reactor. The monomer content of the finished dispersions is quite low and can easily be removed by evacuation. The dwell time in the reaction zone in the present process is usually from 0.3 to 5 hours.

The proportion of ethylene in the copolymer is advantageously from 4 to 60%, preferably from 10 to 40%, by weight relative to the total weight of the copolymer. The proportion of vinyl acetate is advantageously from 50 to 96%, preferably from 60 to 90%, by weight relative to the total weight of the copolymer. Other $\alpha$-olefinically unsaturated monomers may also be used, advantageously in amounts of up to 40%, preferably up to 20%, by weight of the vinyl acetate proportion of the monomer mixture.

Examples of $\alpha$-olefinically unsaturated monomers copolymerizable with vinyl acetate and ethylene are vinyl esters of straight or branched carboxylic acids, preferably vinyl alkanoates, which esters advantageously have from 3 to 20, preferably from 8 to 14, carbon atoms, for example, vinyl formate, vinyl propionate, vinyl 2-ethylhexanoate, vinyl isononoate, vinyl laurate, and the vinyl ester of Versatic acid; vinyl halides and vinylidene halides, for example, vinyl fluoride, vinyl chloride, vinylidene fluoride, and vinylidene chloride; esters of $\alpha$, $\beta$-unsaturated monocarboxylic acids such as alkenoic acids having 3 to 6 carbon atoms with aliphatic alcohols such as alkanols having from 1 to 18, preferably 1 to 8, carbon atoms, for example the methyl, ethyl, propyl, butyl, and 2-ethylhexyl esters of acrylic, methacrylic and crotonic acids; mono or diesters of $\alpha$, $\beta$-unsaturated dicarboxylic acids, such as alkenedioic acids having 4 to 8 carbon atoms, for example, maleic acid, fumaric acid, and itaconic acid with the above alcohols; olefins having from 3 to 10 carbon atoms, for example, propylene, butylene, and pentene; styrene; acrylonitrile; and mixtures of two or more of the said monomers. These monomers are oil-soluble monomers.

Water-soluble monoolefinically unsaturated monomers may also be used as comonomers, advantageously in amounts of up to 5% by weight, relative to the total weight of monomers. Examples of such monomers are $\alpha$, $\beta$-olefinically unsaturated monocarboxylic acids such as alkenoic and alkenedioic acids, preferably having from 3 to 5 carbon atoms, for example, acrylic, methacrylic, crotonic, maleic, fumaric, and itaconic acids; derivatives of these acids, for example, amides and methylolamides thereof, for example, acrylamide and N-methylolacrylamide; vinylpyrrolidone; salts of vinyl sulfonic acid; and mixtures of two or more of the said comonomers.

It can also be advantageous to incorporate multibly olefinically unsaturated comonomers, preferably in amounts of up to 5% by weight, relative to the total weight of monomers, in the polymerization recipe. Examples of such monomers are allyl acrylate, vinyl crotonate, triallyl cyanurate and divinyl adipate.

The emulsifiers and/or protective colloids conventionally used in emulsion polymerization processes can be used in the present process. The emulsifiers or protective colloids may be used alone, or a mixture of an ionic and/or non-ionic emulsifier and a protective colloid may be used.

Suitable protective colloids are, for example, polyvinyl alcohols; partially acylated e.g., acetylated) polyvinyl alcohols having up to 40 mol % of acyl groups; water-soluble cellulose derivatives, particularly water-soluble cellulose derivatives, particularly water-soluble cellulose ethers such as hydroxyethylcellulose, hydroxypropylcellulose, methylcellulose, ethylcellulose, and carboxymethylcellulose; water-soluble starch ethers; polyacrylic acid; water-soluble copolymers of acrylic acid with acrylamide and/or acrylates; and poly-N-vinyl compounds of acyclic or cyclic carboxylic acid amides. The amount of protective colloid used is advantageously from 0.3 to 10% by weight, relative to the total weight of monomers.

Anionic, cationic, and non-ionic emulsifiers or surface-active compounds may be used. Suitable anionic emulsifiers are, for example, alkylsulfates, monosulfates of alkanediols having more than 10 carbon atoms, alkylsulfonates, alkarylsulfonates (e.g., tetrapropylenebenzenesulfonate), alkyldisulfonates, alkaryldisulfonates, sulfates and phosphates of monoalkyl ethers of polyoxyethylene glycols and monoalkaryl ethers of polyoxyethylene glycols, and sulfosuccinic acid alkyl esters having 9 to 20 carbon atoms per alkyl radical. Suitable cationic emulsifiers are, for example, alkylammonium salts, alkylphosphonium salts, and alkylsulfonium salts. Suitable non-ionic emulsifiers are, for example, addition products of 5 to 50 mols of ethylene oxide onto 1 mol of a compound having from 6 to 20 carbon atoms and a labile hydrogen, such as straight or branched alkanols, or alkylphenols, or alkanoic acids, or alkanoic acid amides, or primary or secondary alkyl amines; and block copolymers of propylene oxide and ethylene oxide. The amount of emulsifier employed is suitably from 0.05 to 6% by weight, relative to the total weight of monomers.

Buffers may be added during polymerization so as to regulate the pH of the polymerization medium. Examples of suitable buffers are alkali metal acetates, alkali metal carbonates, and alkali metal phosphates. Alternatively, the pH may be regulated by adding strong alkaline solutions, such as sodium hydroxide solution or ammonium hydroxide solution, or acids, for example, hydrochloric acid, acetic acid, or formic acid.

Conventional molecular weight regulators, for example, aldehydes such as alkanals having 2 to 6 carbon atoms, chlorohydrocarbons having 2 to 6 carbon atoms, and mercaptans, such as alkanethiols having 2 to 6 carbon atoms, may be used, if desired. Organic solvents, for example, water-miscible mono-alcohols and glycols, may also be used, if desired.

The present process yields stable, coagulate-free aqueous copolymer dispersions of various particle sizes. Advantageously, the solids content is up to 65% by weight, preferably from 40 to 60% by weight.

These dispersions dry to form flexible high-strength films. They may be used, for example, as adhesives, as binding agents for paints and plasters on masonry and wood, as binding agents for fibrous materials (nonwovens, cellulose fibers and leather fibers), for manufacturing coating materials for surfaces such as paper, leather, wood, sound-absorbing compositions, and priming materials, as additives to hydraulically hardening compositions such as cement, concrete and mortar, and for consolidating soil. The dispersions can also be dried to form redispersable powders.

The following examples illustrate the invention without being limitative in any respect.

EXAMPLES

In the examples the following general procedure was followed:

Ethylene, vinyl acetate, optionally other comonomers, an aqueous solution of the emulsifier, and an aqueous solution of the reducing agent were pumped from respective storage tanks, in a constant ratio, into a mixer, which was a 1-liter stirrer autoclave which could be cooled. The preliminary emulsion flowed out of the mixer into a first polymerization reactor, which was a 16-liter autoclave equipped with a stirrer and a heating/cooling jacket. The solution of the oxidation components was pumped in a separate stream from a storage tank into this reactor. In the same rate as the components were pumped into the first reactor, the dispersion entered a second reactor, which was a tubular reactor having a diameter of 2.5 cm and a capacity of 5 liters. This reactor terminated in a pneumatically controlled outlet valve, by means of which the pressure in the reactor system could be controlled. The dispersion passed through this valve, in an amount equivalent to the amount of starting components being pumped into the first reactor, into a pressure expansion container. Catalysts could be added subsequently in metered quantities into the second reactor.

EXAMPLE 1

The two reactors were filled with a polymerized dispersion which had been prepared by the same recipe by a batch process. The internal temperature of the first reactor was set at 50° C, the stirrer was set at 150 rpm and the outlet valve was set at 36 atmospheres gauge. Polymerization was commenced by pumping the following partial streams into the mixer: 500 gm/h of ethylene, 4500 gm/h of vinyl acetate, 4500 gm/h of a 4.5% by weight solution of a polyvinylalcohol having a saponification number of 140 and a viscosity of 25 cP (4% by weight aqueous solution), 200 gm/h of a 10% by weight sodium sulfite solution, and 200 gm/h of a 0.75% by weight solution of tert.-butyl hydroperoxide in a 1:1 methanol/water mixture. An additional 100 gm/h of a 5% by weight sodium sulfite solution and 100 gm/h of a 0.5% by weight solution of tert.-butyl hydroperoxide were pumped into the second reactor. About 10 kg/h of dispersion left via the outlet valve as a stable, coagulate-free dispersion, in the same proportion as the partial streams were added. In the first reactor the monomer content was 3% by weight, and the solids content 47% by weight. In the pressure expansion container a foam-free and coagulate-free dispersion is quickly obtained by applying a slight vacuum. The vinyl acetate content, measured before evacuation, was about 0.6% by weight. The solids content of the dispersion was about 50% by weight, and the remaining vinyl acetate content was 0.2% by weight. The copolymerizate had an ethylene content of 9.8% by weight. The time/space efficiency, relative to the contents of the two polymerization reactors, was 0.49 kg/h. After polymerization constantly for 8 days without interruption, the polymerization was halted and the apparatus opened. The wall deposit on the first reactor was only 0 to 2 mm thick, and in the second reactor it was practically zero. In addition it could be removed very easily.

COMPARATIVE EXAMPLE 1

The process was carried out as in Example 1, but with equal molar amounts of oxidation agents and reducing agents, that is, 200 gm/h of a 7% by weight solution of tert.-butyl hydroperoxide were introduced into the first reactor. Although the polymerization commenced vigorously, within 15 minutes it had come almost completely to a standstill. It started again after a further 30 minutes and lasted for about 15 minutes and then came practically to a standstill. The content of monomers in the reactor rose quickly to over 20 per cent by weight as a result.

EXAMPLE 2

The process was carried out as in Example 1, but the following partial streams were added in measured quantities to the first reactor at a temperature of 25° C: 1100 gm/h of ethylene, from 1500 gm/h of vinyl acetate, 2200 gm/h of a 5% by weight solution of polyvinyl alcohol having a saponification number of 140, 200 gm/h of a 10% by weight solution of sodium formaldehydesulfoxylate, and 200 gm/h of a 0.75% by weight solution of hydrogen peroxide. The monomer content in the first reactor was 4% by weight. The pressure in the reaction system was adjusted by the valve to 48 atmospheres gauge. The polymerization progressed uniformly. 5200 gm/h of dispersion left the apparatus via the valve in a quantity proportional to the amounts introduced in measured quantities to the apparatus. The dispersion leaving the apparatus was stable and coagulate-free. The vinyl acetate content of the dispersion leaving the apparatus was about 0.8% by weight and fell to below 0.3% by weight during the evacuation. The ethylene content of the polymerizate was 38% by weight, the K-value measured in acetone, was 86. After progressing constantly for three days the polymerization left the reactor walls free of deposits.

EXAMPLE 3

The process was carried out as in Example 1, but with the following partial streams and at a polymerization temperature of 65° C: 900 gm/h of ethylene, 4100 gm/h of vinyl acetate, 4000 gm/h of an aqueous solution containing 1.0% by weight of hydroxyethylcellulose having a viscosity of 100 cP, 2.3% by weight of nonylphenol polyethyleneoxide ether having 20 mols of ethylene oxide and 0.7% by weight of vinylsulfonate, 200 gm/h of a 10% by weight sodium sulfite solution, and 200 gm/h of a 0.6% by weight solution of tert.-butyl hydroperoxide in a 1 to 1 methanol/water mixture. The polymerization progressed uniformly. During the polymerization there was a monomer content of 5% by weight in the first reactor $R_1$. The finely particulate, coagulate-free dispersion leaving through the valve had a solids content of 54.5% by weight, and a residual vinyl acetate content after evacuation and cooling of below 0.2% by weight. The ethylene content of the polymerizate was 17% by weight.

COMPARATIVE EXAMPLE 2

The process was carried out as in Example 3, but using 200 gm/h of a 0.85% sodium sulfite solution as reducing agent (equimolar amount). The polymerization started slowly. When the monomers were added at the same speed, the monomer content inside the first reactor rose quickly. An increase in the amount of peroxide by adding 5% by weight of tert.-butyl hydroperoxide solution instead of the 0.6% by weight solution also effected no more uniform and no quicker polymerization.

EXAMPLE 4

Polymerization was carried out as in Example 3 but at a temperature of 45° C and using 1000 gm/h of ethylene. The outlet valve was set at 45 atmospheres gauge. 200 gm/h of an 8% by weight solution of sodium formaldehydesulfoxylate containing 10 ppm of $FeCl_3$, calculated as Fe relative to the total weight of the monomers, were used as reducing agent. Polymerization progressed uniformly. In the first reactor a stationary balance of monomers at 4% by weight was established. The stable, coagulate-free dispersion leaving through the valve had a residual vinyl acetate content of 0.3% by weight after slight evacuation. The ethylene content of the polymerizate was 18.5% by weight.

EXAMPLE 5

Polymerization was carried out as in Example 1 at a temperature of 50° C and a reactor pressure of 45 atmospheres gauge, with the following partial streams: 500 gm/h of ethylene, 2500 gm/h of a mixture consisting of 9 parts by weight of vinyl acetate and 1 part by weight of vinyl chloride, 2500 gm/h of an aqueous solution of 2.0% by weight of hydroxyethylcellulose having a viscosity of 250 cP (2% by weight solution), 2.0% of nonylphenol polyethyleneoxide ether having 20 mols of ethylene oxide, 0.2% by weight of vinyl sulfonate and 0.5% by weight of acrylic acid, 200 gm/h of a 7.5% by weight solution of sodium sulfite, and 200 gm/h of a 0.75% by weight solution of tert.-butyl hydroperoxide in a 1:1 methanol/water mixture. An equilibrium of a monomer content of 6% by weight was established in the first reactor. In addition, 50 gm/h of the sodium sulfite solution and 25 gm/h of the tert.-butyl hydroperoxide solution were introduced into the second reactor. The polymerization proceeded uniformly. The residual vinyl acetate content was 1% by weight at the outlet valve. In the pressure expansion vessel this was lowered to 0.2% by weight. The dispersion was stable and coagulate-free. The mimimum film forming temperature was +2° C.

The preceding specific embodiments are illustrative of the practice of the invention. It is to be understood, however, that other expedients known to those skilled in the art, or disclosed herein, may be employed without departing from the spirit of the invention or the scope of the appended claims.

We claim:

1. The process for the continuous manufacture of an aqueous ethylene/vinyl acetate copolymer dispersion, which comprises continuously adding a monomer mixture of ethylene and vinyl acetate containing up to 40% by weight of the share of the vinyl acetate of an α-olefinically unsaturated monomer copolymerizable with ethylene and vinyl acetate, in an aqueous emulsion containing emulsifiers and/or protective colloids, to a confined reaction zone, together with the continuous adding of a free-radical-forming water-soluble redox catalyst system comprising a reducing agent and an oxidizing agent and from 0 to 50 ppm, based on the total monomers, of a heavy metal in the form of a heavy metal salt, maintaining said confined reaction zone at a temperature sufficient to effect polymerization and continuously withdrawing an aqueous ethylene/vinyl acetate copolymer dispersion from said confined reaction zone, the improvement which consists of (a) continuously adding said reducing agent and said oxidizing agent in a molar ratio of at least 3:1 and (b) continuously adding said monomer mixture at such a rate that the concentration of unreacted monomers at no place in said confined reaction zone exceeds 15% by weight of the total weight of the reaction mixture in the reaction zone.

2. The process of claim 1, wherein said reducing agent and said oxidizing agent are added in a molar ratio of from 3:1 to 10:1.

3. The process of claim 1, wherein said concentration of unreacted monomers at no place in said confined reaction zone exceeds 10% by weight of the total weight of the reaction mixture in the reaction zone.

4. The process of claim 1 wherein said confined reaction zone prior to said continuous addition is substantially filled with a polymerized dispersion of the same recipe prepared by a batch process.

5. The process of claim 1 wherein said aqueous ethylene/vinyl acetate copolymer dispersion being continuously withdrawn from said confined reaction zone has a solids content of from 40 to 65% by weight.

* * * * *